March 1, 1960 J. R. GREEN 2,926,509
DEVICE FOR PREVENTING SHAFT ROTATION
Filed Nov. 14, 1957

INVENTOR.
JAMES R. GREEN,
BY
Flam and Flam
ATTORNEYS.

United States Patent Office 2,926,509
Patented Mar. 1, 1960

2,926,509

DEVICE FOR PREVENTING SHAFT ROTATION

James R. Green, Garden Grove, Calif., assignor to U. S. Electrical Motors, Inc., Los Angeles, Calif., a corporation of California Application November 14, 1957, Serial No. 696,553

1 Claim. (Cl. 64—1)

This invention relates to a restraint be placed against rotation of a shaft.

Such a device is especially useful in structures in which it is necessary to adjust the shaft in an axial direction. For example, it is now common to provide a vertical electric motor having a hollow shaft coupled to an inner shaft that is located within the hollow shaft. The inner shaft operates pump runners in an underground well, the runners being located in a pump casing or housing.

Provisions are made in such pump drives to adjust the position of the runners with respect to the casing, in order to ensure optimum pump operation. These adjustment provisions usually include a nut threaded on the inner shaft, resting upon a flange or collar carried by the hollow shaft. In order to make it possible to turn the nut relative to the inner shaft for effecting the adjustment, it is essential to restrain both shafts against angular movement. The obvious way to do this is to engage the periphery of one of the shafts as by a wrench or the like.

Such a method imposes undesired strains and stresses on the shaft structure. It is one of the objects of this invention to provide a convenient and simple expedient to restrain rotation of the normally rotating structure during the adjustment process.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claim.

Referring to the drawings.

Figure 1:
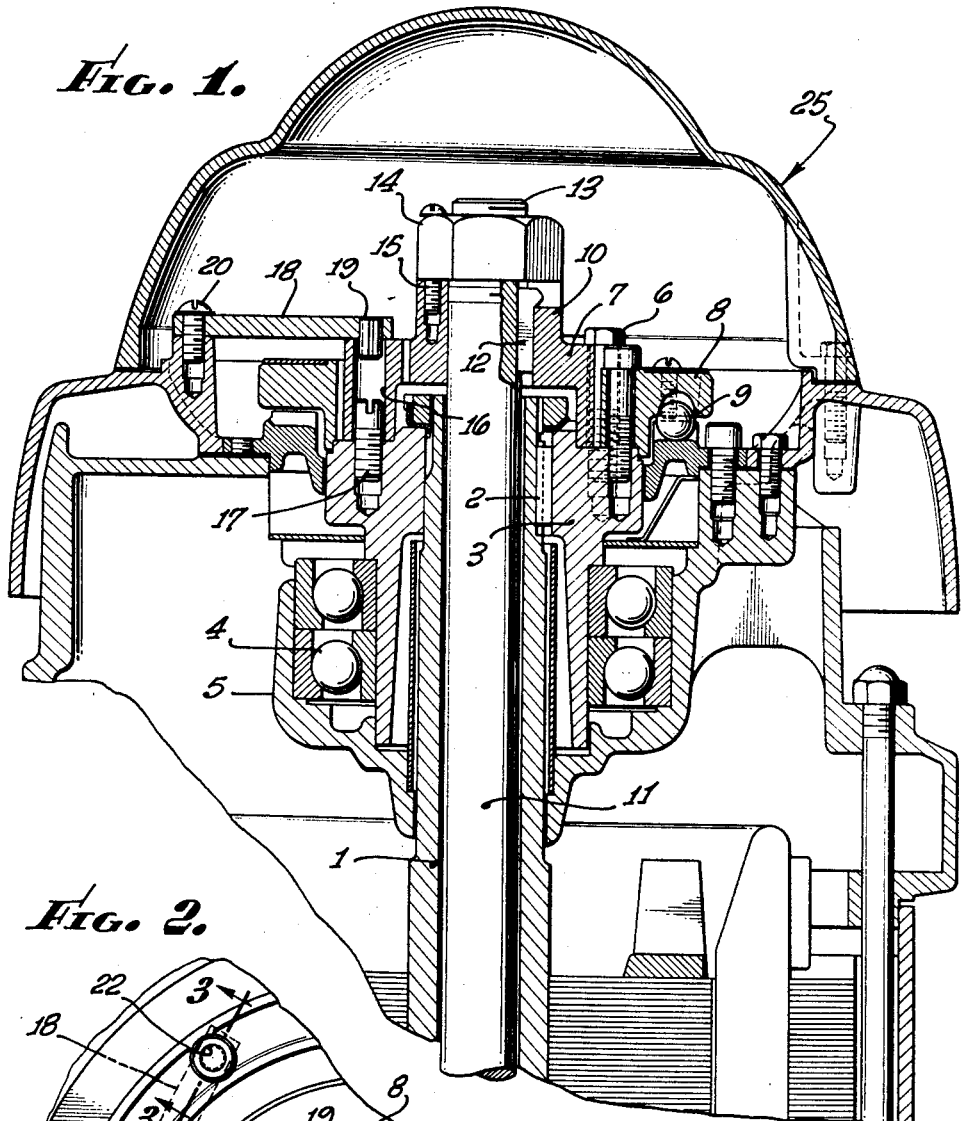
Figure 1 is a longitudinal sectional view of an electric motor structure incorporating the invention, some of the motor parts being indicated diagrammatically.

In the present instance, the rotary elements of an electric motor are so arranged that a vertical hollow shaft 1 is driven by the rotor part of the motor. This vertical hollow shaft 1 is keyed as by the aid of a key 2 to a lower coupling member 3, mounted for rotation by the aid of one or more thrust ball bearing structures 4. These ball bearing structures are supported on a bearing bracket 5 forming the upper part of a casing for the motor parts. A canopy or cover structure 25 serves to protect the parts against ingress of foreign matter.

The lower coupling member 3 is joined as by the aid of a plurality of machine screws 6 to an upper coupling member 7. This upper coupling member 7 rests upon the lower coupling member 3. Surrounding the lower coupling member 3 and connected thereto is one element of a non-reverse drive 8 cooperating with a stationary non-reverse drive element 9.

Since the structure thus far described is quite conventional, it is unnecessary to describe it in greater detail.

The upper coupling member 7 is provided with a central boss 10 through which the pump drive shaft 11 extends. The pump drive shaft 11 is keyed to be driven by the coupling member 10 by the aid of a key 12. The inner shaft 11 has an upper end 13 which is threaded for the reception of a nut 14. Obviously, by rotating the nut 14 and holding the shafts 1 and 11 against rotation, it is possible to raise or lower the shaft 11, and thereby to adjust the position of the pump runners carried by this shaft 11.

In order to maintain the adjustment, a screw 15 is provided passing near the edge of the nut 14 and engaging an appropriate threaded aperture in the boss 10.

In order to make it possible readily to manipulate the nut 14 and to restrain the rotating elements of the structure against angular movement, use is made of a structure now to be described.

The coupling member 7 is provided with an aperture 16 into which is telescoped the upper portion of a headless screw 17. This headless screw 17 is accommodated in the lower coupling member 3. A link or bar 18 carries a pin 19 which is adapted to be placed within the aperture 16 to restrain the rotating parts. This pin 19 is shown in the present instance as made of a split tube formed of resilient material, but other means for forming a stopping projection may be used. The link or bar 18 is pivotally mounted on a screw 20 which engages the threaded boss 21 on a stationary part of the apparatus.

Figure 2:
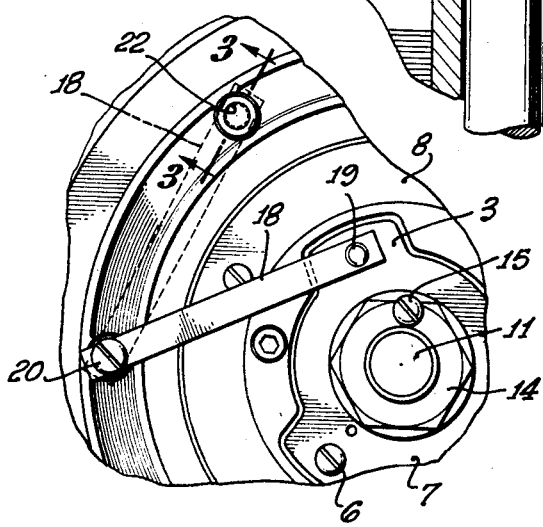
Fig. 2 is a fragmentary top plan view of the structure shown in Fig. 1 with the canopy part of the cover being removed.
Figure 3:
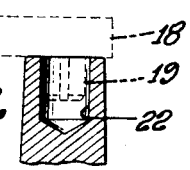
Fig. 3 is a detail sectional view, taken along a plane corresponding to line 3—3 of Fig. 2.

When it is desired to release the rotatable parts so that the motor may operate, the screw 20 is manipulated to permit lifting of the bar 18 from the position shown in Fig. 1. Thence, it can be moved to the phantom line position of Fig. 2. In this position, the pin 19 is engaged in an aperture 22 formed on a stationary part of the structure. Screw 20 can, of course, be tightened to hold the link or bar 18 in this position.

The inventor claims:

In an electric motor structure having a motor, a rotary shaft mounting the rotor, a drive shaft, adjustable securing means between said rotor shaft and said drive shaft for variation of the relative axial positions of the shafts, and a stationary frame, the combination therewith of a part connected to one of the shafts and having an accessible recess; said frame having a corresponding recess; said frame also having mounting means; and a bar having one end provided with a detent portion selectively engageable with the recesses; said mounting means including a clamp for holding the bar in either selected position; said bar, when cooperating with the recess of said shaft part locking the said one shaft against angular movement to facilitate adjustment of said adjustable securing means.

References Cited in the file of this patent

UNITED STATES PATENTS

| | | |
|---|---|---|
| 107,666 | Courts | Sept. 27, 1870 |
| 362,491 | Carpenter | May 10, 1887 |
| 1,317,096 | Palmer et al. | Sept. 23, 1919 |
| 1,714,484 | Johnson | May 21, 1929 |